United States Patent [19]

Morii

[11] Patent Number: 4,686,861

[45] Date of Patent: Aug. 18, 1987

[54] GASKET TYPE PRESSURE SENSOR

[75] Inventor: Hiroaki Morii, Aichi, Japan

[73] Assignee: NGK Spark Plug Co., Ltd., Nagoya, Japan

[21] Appl. No.: 780,113

[22] Filed: Sep. 25, 1985

[30] Foreign Application Priority Data

Sep. 26, 1984 [JP] Japan ................................ 59-145424

[51] Int. Cl.$^4$ .......................... G01L 1/16; G01L 23/10
[52] U.S. Cl. ..................................... 73/862.68; 73/35;
    73/115; 73/754; 73/DIG. 4; 310/338
[58] Field of Search ................... 73/35, 115, 714, 754,
    73/DIG. 4, 862.68, 310/338

[56] References Cited

U.S. PATENT DOCUMENTS

| | | | |
|---|---|---|---|
| 3,151,258 | 9/1964 | Sonderegger et al. | 73/35 |
| 4,227,403 | 10/1980 | Dooley et al. | 73/115 |
| 4,524,625 | 6/1985 | Takeuchi | 73/35 |
| 4,566,316 | 1/1986 | Takeuchi | 73/115 |

FOREIGN PATENT DOCUMENTS 882626 6/1943 France ..................................... 73/35

Primary Examiner—John Chapman
Attorney, Agent, or Firm—Sughrue, Mion, Zinn, Macpeak and Seas

[57] ABSTRACT

The present invention relates to a gasket type pressure sensor mounted on a vibrating body such as a cylinder head of an engine generating vibration derived from knocking and fuel injection, and used to detect pressure fluctuation by means of piezoelectric elements. An object of the present invention is to prevent an oil- and water-leakage from a portion of the gasket type pressure sensor and eliminate caulking and electrical short-circuiting. This is accomplished by placing a presser metal portion between the piezoelectric elements and the seam of a metal case which encloses them.

4 Claims, 6 Drawing Figures

GASKET TYPE PRESSURE SENSOR

BACKGROUND OF THE INVENTION

The present invention relates to a gasket type pressure sensor mounted on a vibrating body such as a cylinder head of an engine generating vibration derived from knocking and fuel injection, and used to detect pressure fluctuation by means of piezoelectric elements.

A pressure sensor of this type is, for instance, inserted between the gasket seat face of an engine spark plug and the plug seat of a cylinder head to secure the pressure sensor to the surface of a vibrating body by utilizing the contraction of a proper screw body. The vibration generated by the vibrating body causes the piezoelectric element to produce compressive distortion and an output signal synchronous with the vibration is obtained from the piezoelectric element. The pressure sensor is used to detect pressure fluctuations at the time of knocking and fuel injection when, as aforementioned, it is applied for use in the cylinder head.

As shown in FIG. 6, there has been developed a pressure sensor having an integrated body covered with a metal case, the integrated body comprising piezoelectric elements and a presser metal.

The manufacture of such a conventional apparatus comprises piling two piezoelectric elements a, a with an electrode b sandwiched therebetween; further mounting an inverted T-shaped presser metal c in cross section with an upwardly projected pressure-receiving portion d on the above combination, the pressure metal c being made of material having a low coefficient of expansion such as Invar and Kovar brand iron alloys, trademarks of Westinghouse Corp.; and 42Ni-Fe with a pressure receiver d; covering the combination thus built with a metal case e; caulking the ends of the metal case e inward by the shoulders of the pressure receiver d; and upwardly projecting the pressure receiver d.

SUMMARY OF THE INVENTION

With the above-described construction, the compressive pressure derived from the screw body such as a spark plug is applied to the pressure receiver d in the direction of an arrow and, even if the metal case e is tightly caulked on both shoulders of the presser metal c, the caulked portion f is subject to relaxation because of plastic deformation. The disadvantage is that the aforesaid caulked portion f is likely to become loose, forming sources of the deterioration of the piezoelectric elements a, a and electrical shortcircuiting because the oil- and water-leakage from the shoulders of the pressure receiver d makes the inside of the metal case e damp. An object of the present invention is to eliminate such shortcomings.

BRIEF DESCRIPTION OF THE DRAWINGS

The accompanying drawings illustrate embodiments of the present invention.

BRIEF DESCRIPTION OF THE PREFERRED EMBODIMENTS

The present invention is characterized by wrapping up the integrated body in the metal case and locating the seam of the wrapping on the surface under pressure.

The pinching pressure derived from either screw body or vibrating body (hereinafter respectively called the "pressure body") is applied to the piezoelectric element through the metal case. Consequently, play and liquid penetration at the seam are prevented to a greater extent because the portion by the seam is constructed.

Figure 1:
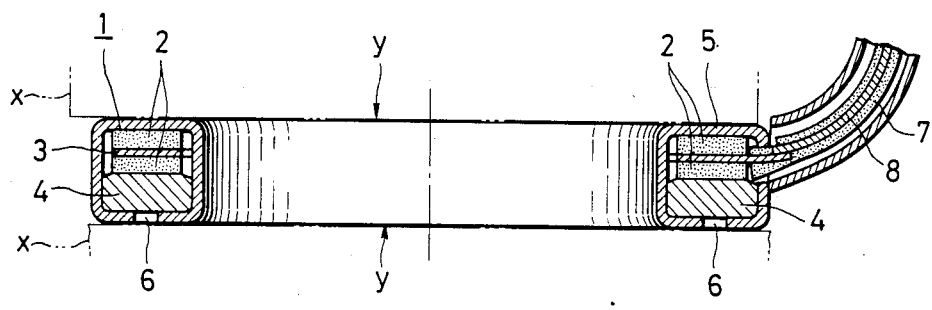
FIG. 1 is a vertical side view of a first embodiment of the present invention.
Figure 2:
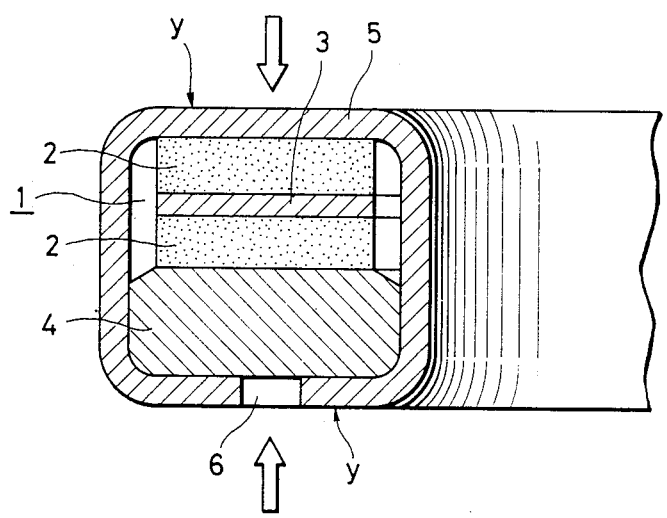
FIG. 2 is an enlarged vertical side view of the same portion of FIG. 1.

FIGS. 1 and 2 show the basic construction of an embodiment of the present invention.

Piezoelectric elements 2, 2 are piled with a conductive plate 3 sandwiched therebetween and an annular pressure metal 4 produced from metal having a low coefficient of expansion is arranged on the under surface of the above combination so as to form an integrated body 1. The integrated body 1 is wrapped up in a metal case 5 by deep drawing and the seam 6 is positioned on the surface y, y under pressure and in contact with a pressure body x, x such as cylinder head and a plug. As shown in FIG. 1, a lead wire 7 covered with the metal jacket is inserted in a cutout hole forming part of the metal case 5 and the insulated conductor 8 of the lead wire 7 is connected to the conductive plate 3, so that an annular pressure sensor is made up. A spacer 9 shown in FIGS. 3 through 5 may be provided, if necessary, between the upper piezoelectric element 2 and the top portion of the metal case 5.

When pressure is applied by the pressure body x, x to the top and bottom faces of the integrated body 1 thus constructed, the pressure is caused to act on the top and bottom faces directly, whereby the pressure is applied to the piezoelectric elements 2, 2 through the presser metal 4. Consequently, voltage proportionate to the aforementioned pressure fluctuation is produced in the piezoelectric elements 2, 2 and taken out of the conductive plate 3 as an output signal through the insulated conductor 8.

Figure 3:
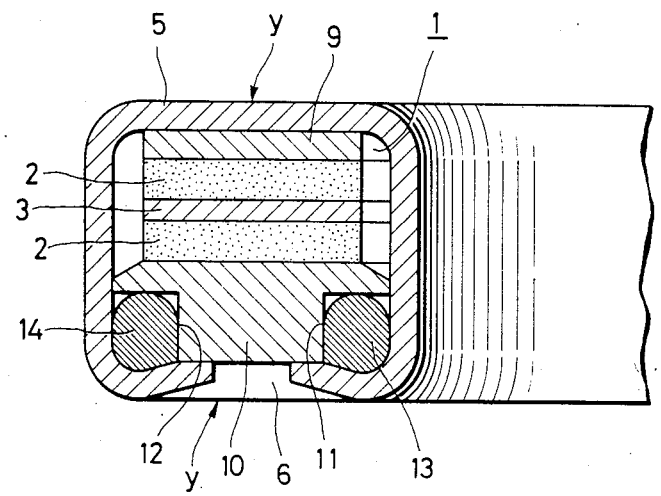
FIG. 3 is an enlarged vertical side view of part of a second embodiment thereof.
Figure 4:
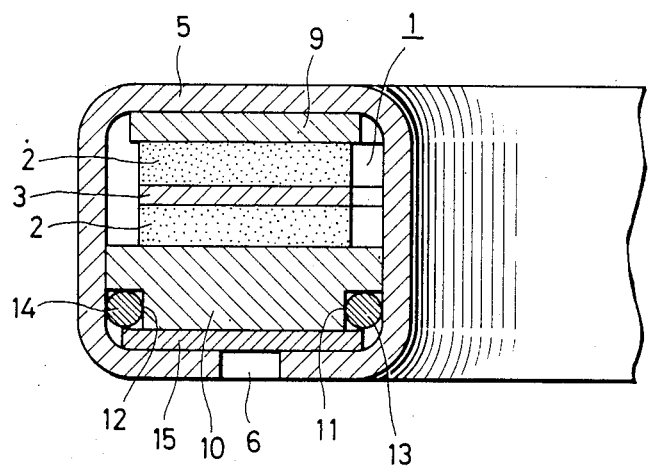
FIG. 4 is an enlarged vertical side view of part of a third embodiment thereof.
Figure 5:
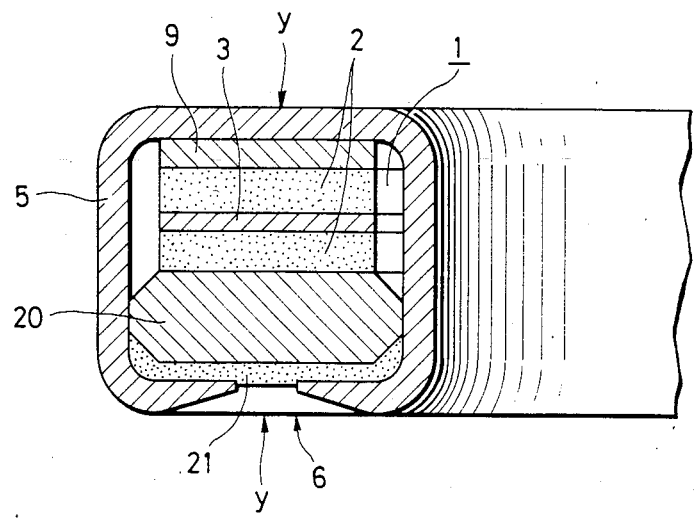
FIG. 5 is an enlarged vertical side view of part of a fourth embodiment thereof.
Figure 6:
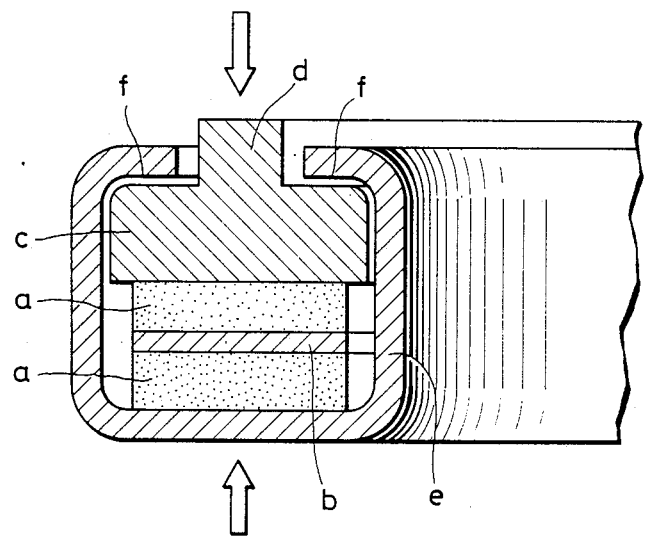
FIG. 6 is an enlarged vertical side view of part of a conventional construction.

FIGS. 3 through 5 illustrate other improved versions of the above-described embodiment in view of the basic construction. In other words, although the aforesaid arrangement is designed to improve airtightness as compared with the prior art, reduction in airtightness being attributed to the caulked end portions of the metal case 5, the following examples are intended to prevent water- and oil-leakage from the caulked ends more effectively.

In the case a pressure sensor of FIG. 3, grooves 11, 12 are formed at the lower external and internal edges of a presser metal 10 just below a pair of piezoelectric elements 2, 2 and O-rings 13, 14 made of fluoric or silicon resin material are fitted into grooves 11, 12.

The integrated body 1 thus constructed is wrapped up in metal case 5 and the seam 6 thereof is arranged on the under surface of the presser metal 10. In this example, there is provided a spacer 9 between the upper piezoelectric element 2 and the top portion of the metal case 5. The integrated body 1 is airtightly enclosed in the metal case 5 by caulking both ends of the metal case 5 inward.

Even if liquid is allowed to penetrate through the seam 6 thus arranged, the liquid will be checked by the O-rings 13, 14 and thus its influence on the piezoelectric elements 2, 2 will be removed.

In the case of a pressure sensor of FIG. 4, the O-rings 13 and 14 are also fitted into the grooves 11 and 12 formed in the pressure metal 10 and plate-shaped packing 15 is additionally arranged on the bottom face of the presser metal 10 just as the O-rings 13 and 14 are covered with the packing. The O-rings 13 and 14 are tightly held in the grooves 11, 12 because they are downtrodden at both ends of the plate-shaped packing. Accordingly, the airtightness by the working of O-rings 13, 14 is further improved.

In the case of a pressure sensor of FIG. 5, a fluoric resin 21, for instance, is glued to the under surface of a presser metal 20 and the edges of the metal case 5 are caulked so that the edges may lodge in the resin 21. Since the airtightness is further improved, liquid penetration through the seam 6 is prevented by the resin 21.

As the pressure sensor according to the present invention is built up by piling the piezoelectric elements 2, 2 and the presser metal 4, 10 or 20 to make the integrated body 1, wrapping up the integrated body 1 in the metal case 5 and locating the seam 6 thereof on the surface y, y under pressure and in contact with the pressure body x, the metal case 5 is solely responsible for bearing the pinching pressure applied by the pressure body x, whereby liquid penetration through the gaps between both ends of the seam 6 and the interated body 1 can be prevented practically and effectively.

I claim:

1. A gasket type pressure sensor comprising a presser metal portion and a plurality of piezoelectric elements piled up on said presser metal portion to form an integrated body, and a metal case covering at least three sides of an outer surface of the integrated body, said presser metal portion and said metal case together completely surrounding said plurality of piezoelectric elements, said metal case including a seam extending along a portion thereof and being wrapped around said integrated body, said seam being positioned on a fourth side of said integrated body adjacent the presser metal portion, wherein, during operation of said sensor, pressure is applied to said metal case directly, and to said presser metal portion indirectly through said metal case to seal the sensor along the seam.

2. A gasket type pressure sensor as claimed in claim 1, wherein said integrated body includes O-rings produced from material comprising at least one element selected from the group consisting of fluoric and silicon resin, said presser metal portion having an upper surface contacting said piezoelectric elements and a lower surface contacting said metal case, said presser metal portion further having a plurality of grooves formed in said lower surface, said O-rings being fitted into said grooves and positioned between said metal case and said presser metal portion.

3. A gasket type pressure sensor as claimed in claim 1, wherein said presser metal has an upper and a lower surface, and wherein said integrated body includes a fluoric resin layer formed on the lower surface of said presser metal, said resin layer being wrapped up in said metal case.

4. A gasket type pressure sensor as claimed in claim 1, wherein said integrated body includes O-rings produced from material comprising at least one element selected from the group consisting of fluoric and silicon resin, said presser metal portion having an upper surface contacting said piezoelectric elements and a lower surface contacting said metal case, said presser metal lower surface, said O-rings being fitted into said grooves, and further includes a plate-shaped packing positioned between said metal case and said presser metal portion.

* * * * *